(12) United States Patent
Kolb et al.

(10) Patent No.: US 6,422,207 B1
(45) Date of Patent: Jul. 23, 2002

(54) FUEL VAPOR SEPARATOR

(75) Inventors: Richard P. Kolb, Prairieview, IL (US); Harvey Ruth, Maryland Heights, MO (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/724,821

(22) Filed: Nov. 28, 2000

(51) Int. Cl.[7] .......................... F02M 31/20; F02M 37/20
(52) U.S. Cl. ...................... 123/461; 123/457; 123/516
(58) Field of Search ............................... 123/456, 457, 123/461, 516, 511

(56) References Cited

U.S. PATENT DOCUMENTS

| | | | | |
|---|---|---|---|---|
| 4,539,961 A | * | 9/1985 | Atkins et al. | 123/516 X |
| 5,197,436 A | * | 3/1993 | Ozawa | 123/456 |
| 5,389,245 A | * | 2/1995 | Jaeger et al. | 123/516 X |
| 5,647,331 A | * | 7/1997 | Swanson | 123/516 |
| 5,890,472 A | * | 4/1999 | Saito | 123/516 |
| 6,012,434 A | * | 1/2000 | Hartke et al. | 123/516 |
| 6,318,344 B1 | * | 11/2001 | Lucier et al. | 123/516 |

FOREIGN PATENT DOCUMENTS

JP 11-82215 * 3/1999

* cited by examiner

*Primary Examiner*—Tony M. Argenbright
(74) *Attorney, Agent, or Firm*—Timothy J. Ziolkowski (57) ABSTRACT

A fuel vapor separator is disclosed having a fuel distribution network, a damper chamber, and a closed biased vent valve. The fuel vapor separator has a housing having two opposed ends enclosed by top and bottom covers. The housing is formed by extrusion and the top and bottom covers are molded identically. An integral fuel distribution network is provided to supply fuel to each fuel injector of an engine and to receive fuel return from each fuel injector. A fuel damper chamber communicates with the fuel inlet port to absorb pressure surges. A fuel float having an upwardly extending float arm is located in an enclosed fuel chamber and connected to a closed biased vent valve mounted in the housing. The float is arranged to decouple from the closed biased vent valve to present "engine spit."

30 Claims, 7 Drawing Sheets

FUEL VAPOR SEPARATOR

BACKGROUND OF THE INVENTION

The present invention relates generally to a fuel vapor separator for a fuel delivery system of an internal combustion engine and, more particularly, to a fuel vapor separator that incorporates a fuel distribution network, a closed biased vent valve, and a damper chamber, among other things, to control fuel temperature and remove vapor from the fuel.

Fuel injection systems are used to supply fuel to many modem engines because their ability to precisely meter fuel flow and accurately control the mixture of fuel and air delivered to an engine, which dramatically improves engine performance while reducing engine exhaust gas emissions. In one type of fuel injection system, a fuel pump transfers fuel under high pressure directly from a fuel tank to a fuel rail connected to the individual fuel injectors of the engine. Excess fuel not used by the fuel injectors during periods of low engine demand is returned to the fuel tank. Unfortunately, the returned fuel can vaporize or become aerated and foamy when mixed with the fuel in the fuel tank, which can then lean out the air-fuel mixture delivered to the engine.

Fuel vapor separators are often used in fuel delivery systems of internal combustion engines to remove entrained vapor from the fuel. Heat build up in an engine can adversely affect the engine's fuel delivery system by causing the fuel to become vaporized before it is introduced into the engine's combustion chamber. The vaporized fuel interferes with proper engine combustion and, consequently, with engine power and performance. Pressure vessels, such as fuel vapor separators, are known for reducing or eliminating vaporized fuel in the fuel delivery system. The fuel vapor separator includes a housing where fuel is passed through, thereby allowing vapor to separate from the liquid fuel. During operation, the vapor is vented from the fuel vapor separator through a valve arrangement that may be operated by a float assembly.

Unfortunately, fuel that is returned to the fuel vapor separator under high pressure as well as high velocity causes the fuel to foam in the fuel vapor separator. Air and fuel vapor that is returned to the fuel vapor separator can also stir up the liquid fuel and cause the fuel to foam and vaporize. Fuel foaming is highly undesirable because it can interfere with proper cooling and maintaining enough liquid fuel in the fuel vapor separator for high pressure fuel pump operation. Should the amount of foam in the fuel vapor separator become excessive, foam may be pumped to the engine resulting in lean engine operation, stalling or, even worse, overheating of the engine due to fuel starvation. Moreover, too much fuel vapor/gas in the fuel vapor separator is also undesirable because it can result in increased fuel vapor venting from the fuel vapor separator and into the intake manifold of the engine, thereby resulting in rough engine operation, spark plug fouling, and increased exhaust gas emissions.

While these fuel vapor separators perform acceptably in many applications, they can be expensive to manufacture because of the intricacy of the component parts and the consequent long assembly time. Another disadvantage of these known fuel vapor separators is that they must be sized for use with a specific engine and thus tooling costs can be expensive in order to manufacture a variety of sizes of vapor separators for use on differing engine sizes. A further disadvantage of these fuel vapor separators is that they require extra space for a separate mechanical valve system to exhaust excess pressure from systems after the fuel vapor separator is pressurized. These fuel vapor separators are unattractive for use in certain outboard marine internal combustion engines, which are used to power boats and other watercraft.

It is advantageous for outboard marine engines to comply with United States Coast Guard safety regulations, which limits the space and the length of pressurized fuel lines connecting the high pressure fuel pump to the fuel vapor separator. Typically, to keep the length of the pressurized fuel lines as short as possible, the high pressure fuel pump, fuel vapor separator, and pressurized fuel lines are an integral part of the engine assembly and housed under its cowling.

As mentioned above, during operation of outboard marine engines, the vapor is vented from the fuel vapor separator through a valve arrangement that is operated by a float assembly. Outboard marine engines are subjected to fierce oscillations and vibrations as the boat travels over waves in the lake or sea. These unpredictable variations often cause the float in the separator to bounce up and down, leading to unintended opening of the vent valve and allowing fuel to vent into the engine, thereby temporarily flooding the engine. This condition is often referred to as "engine spit." It would, therefore, be desirable to improve the design of the fuel vapor separator to overcome the aforementioned problems.

In view of the above-described potential problems relating to fuel vapor separators, the need has arisen to design a fuel vapor separator which is simple to manufacture and can be easily assembled in a variety of sizes. Such a new design of a fuel vapor separator will effectively remove vapor from pressurized fuel, distribute the pressurized fuel to all fuel injectors, and control the temperature of the pressurized fuel during engine operation.

SUMMARY OF THE INVENTION

The present invention relates to a fuel vapor separator having a fuel distribution network, a damper chamber, and a closed biased vent valve, which are assembled within the fuel vapor separator. This new design helps to minimize the limited space available within an outboard marine engine, and by its design, it is relatively simple to assemble and can be easily manufactured in a variety of sizes.

Accordingly, the present invention includes a fuel vapor separator for an internal combustion engine which includes a housing having two opposed ends. Top and bottom covers enclose the two open opposed ends of the housing and a fuel distribution network is incorporated into the fuel vapor separator to supply fuel to each fuel injector of the engine and to receive fuel return from each fuel injector.

In accordance with another aspect of the invention, a fuel vapor separator includes a housing having an enclosed chamber. A fuel float is provided that has an upwardly extending float arm located in the enclosed fuel chamber and a closed biased vent valve is mounted on the housing and controlled by the fuel float. A lever arm is connected to the closed biased vent valve, and the upwardly extending float arm such that the lever arm is configured to decouple from the vent valve to eliminate unintended opening of the vent valve.

In accordance with one further aspect of the invention, a fuel vapor separator includes a housing having two opposed ends and a top and bottom cover that enclose the two open opposed ends of the housing. The top and bottom covers are constructed substantially identical and use an interchangeable gasket disposed between the top and bottom covers and the housing. Not only is assembly and manufacturing simplified with the arrangement, but also the identical top and bottom covers, together with the interchangeable gasket, creates a plurality of coolant passage in the fuel vapor separator for coolant flow.

In accordance with another further aspect of the invention, a method is provided for reducing engine spit. The method allows float movement vertically within an enclosed fuel chamber of a fuel vapor separator without opening a vent valve that is biased in a closed position. Engine spit caused by unintended opening of the closed vent valve due to engine vibration is thereby reduced significantly and in many cases, eliminated altogether.

Various other features, objects and advantages of the present invention will be made apparent from the following detailed description and the drawings.

BRIEF DESCRIPTION THE DRAWINGS

The drawings illustrate the best mode presently contemplated for carrying out the invention.

In the drawings.

DETAILED DESCRIPTION OF THE PREFERRED EMBODIMENT

Figure 1:
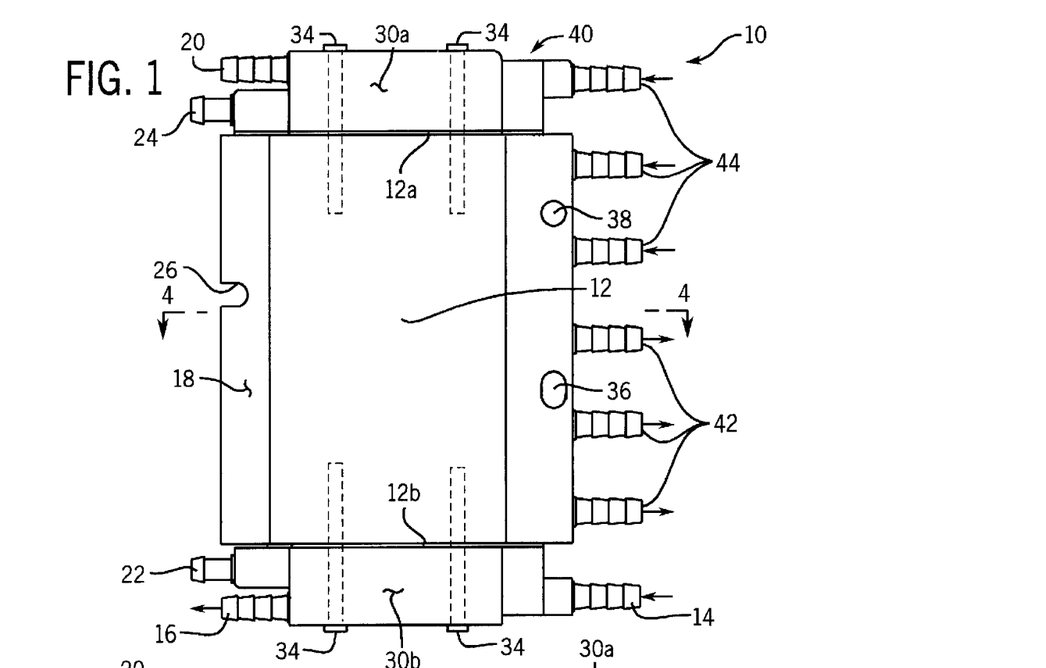
FIG. 1 is a front elevation view of a fuel vapor separator incorporating the present invention.

FIG. 1 is a front elevation view of a fuel vapor separator 10 constructed in accordance with the present invention. The fuel vapor separator 10 includes a housing 12 having two opposed ends 12a, 12b, a top cover 30a and a bottom cover 30b spaced apart by the housing 12. The housing 12 preferably is formed by extrusion techniques and made of a suitable aluminum composition. The housing 12 has a substantially rectangular shape and is preferably 2" wide by 10" long. As will be further described hereinafter, the top and bottom covers 30a, 30b each include at least two ports which open into the housing 12 and which are located on the opposite ends of the respective cover 30a or 30b when assembled. Bolts 34 retain the top and bottom covers 30a, 30b to the housing 12.

Figure 13:
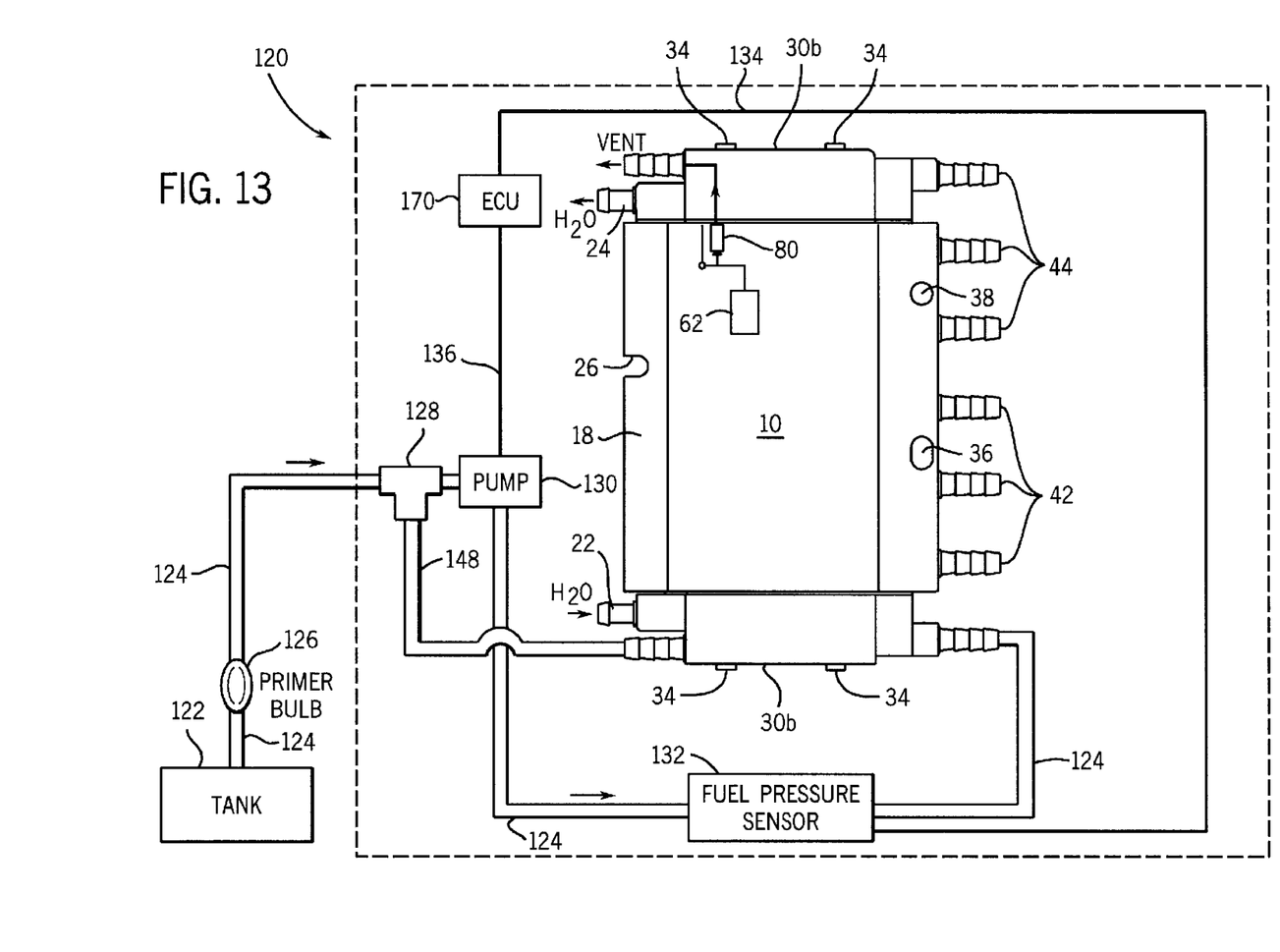
FIG. 13 is a schematic diagram of a fuel delivery system employing the fuel vapor separator in accordance with a preferred embodiment of the present invention.

The bottom cover 30b includes a fuel supply inlet port 14 to receive fuel from a high-pressure fuel pump 130, as shown in FIG. 13, and to transfer fuel to a fuel distribution network 40. The fuel distribution network 40 transfers fuel to the fuel injectors (not shown) through a plurality of outlet ports 42. Excess fuel from the fuel injectors is returned to an internal fuel chamber of the fuel vapor separator 10 through a plurality of inlet ports 44 located on the upper portion of the fuel distribution network 40 and the top cover 30a. The fuel vapor separator 10 removes vapor from the excess fuel by venting the vapor through a vent port 20. The excess fuel is then transferred back to the fuel pump via an outlet port 16 for re-circulation, as will be described with reference to FIG. 13.

To maintain the temperature of the fuel in the fuel vapor separator 10 at an acceptable level, liquid coolant is circulated through the fuel vapor separator 10. The coolant flows into and out of the fuel vapor separator 10 through inlet and outlet ports 22 and 24, respectively. As is typical in most outboard marine applications, the liquid coolant is supplied by the operating environment which circulates lake or sea water for cooling.

The fuel vapor separator 10, having the fuel distribution network 40 incorporated integrally incorporated integrally is mounted to the side of an outboard marine engine (not shown) through mounting holes 36, 38 on one side of the housing 12 and notch 26 on a mounting flange 18 on the opposite side of the housing. Although the preferred embodiment integrates the fuel distribution network 40 within the fuel vapor separator 10, the fuel distribution network 40 may alternatively be detachably mounted on the fuel vapor separator 10.

Figure 2:
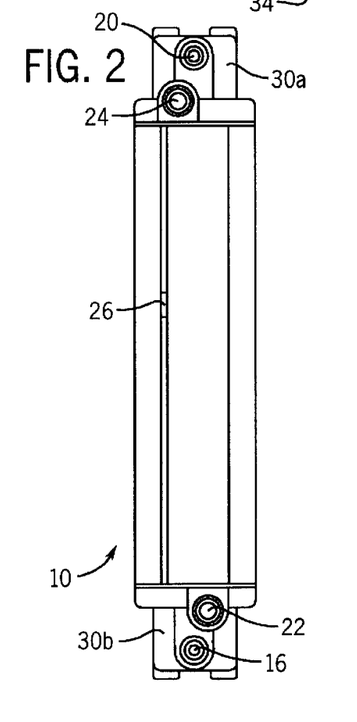
FIG. 2 is a left side elevation view of the fuel vapor separator of FIG. 1.

Referring now to FIG. 2, a left side elevation of the fuel vapor separator 10 shows the coolant port 22 inlet and the coolant outlet port 24, in the bottom cover 30b and the top cover 30a, respectively. The fuel outlet port 16 also extends from the bottom cover 30b, and the vent port 20 extends from the top cover 30a.

Figure 3:
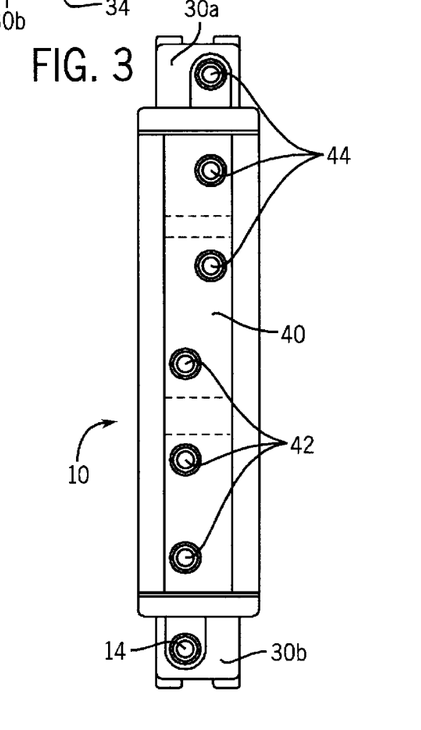
FIG. 3 is a right side elevation view of the fuel vapor separator of FIG. 1.

FIG. 3 is a right side view showing the inlet and outlet ports 42, 44 of the fuel distribution network 40. The inlet and outlet ports 42, 44 are configured in offset positions relative to one another because of separate internal passages for fuel supply and return. As can be seen, one of the three inlet ports 44 to the separator 10 is mounted on the top cover 30a for transferring excess fuel from one of the fuel injectors back to the separator 10.

Figure 4:
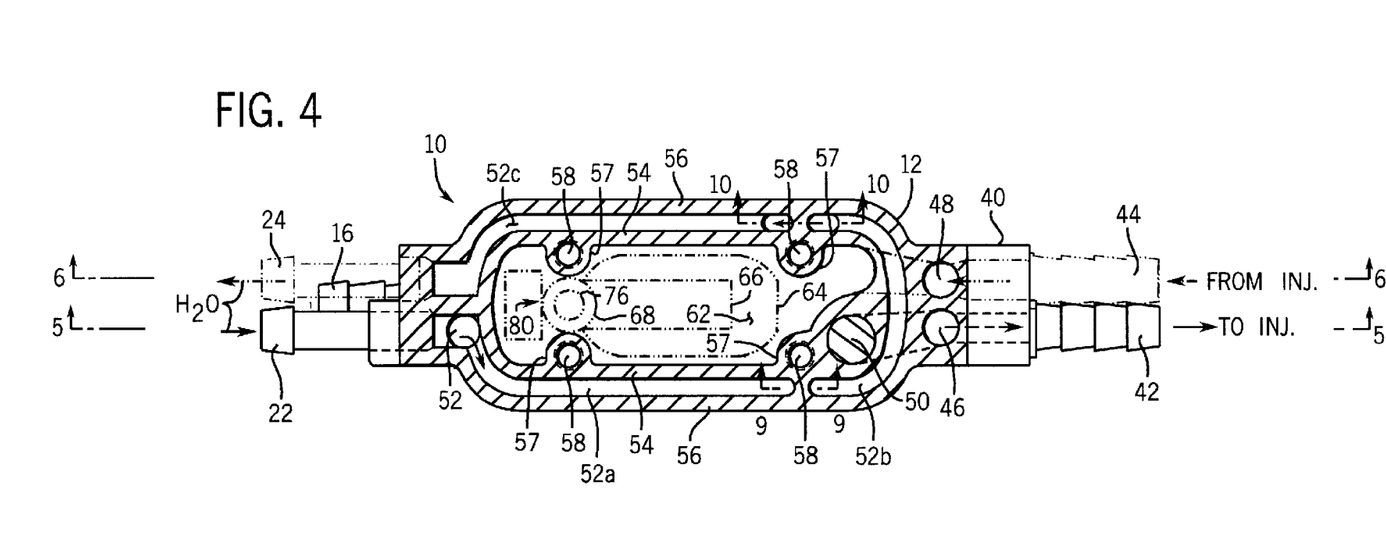
FIG. 4 is a sectional plan view of the fuel vapor separator taken along line 4—4 of FIG. 1.

Referring to FIG. 4, a cross-sectional view of the fuel separator 10 is shown taken along line 4—4 of FIG. 1, substantially rectangular enclosed fuel chamber 62 is formed in the housing 12. The phantom lines depict cross sections of a float 64 connected to a closed biased vent valve 80. The closed biased vent valve 80 has a seat 76 and a needle 68. Advantageously, the float 64 is configured to move vertically within the enclosed fuel chamber 62 without opening the closed biased vent valve 80. The enclosed fuel chamber 62 of the housing 12 is constructed to snuggly hold the float 64 laterally and to allow free float movement vertically. To achieve this effect, the float 64 has a cross sectional shape that substantially matches the cross sectional shape of the enclosed chamber 62, to guide the movement of the float 64. The operation of the float 64 and the closed bias vent valve 80 will be described in further detail with reference to FIGS. 5 and 11.

The enclosed chamber 62 is bordered by a plurality of extruded bosses 57. The extruded bosses 57 are bored and threaded to receive the bolts 34 in openings 58 to retain the top and bottom covers 30a, 30b to the housing 12 as best seen in FIG. 1. As mentioned above, the fuel distribution network 40 includes a fuel supply passage 46 and a fuel return passage 48, which transfers fuel between the fuel injectors and the fuel vapor separator 10 through inlet and outlet ports 42 and 44. Incoming fuel under high pressure from the fuel pump 130 travels through the fuel supply passage 46 and transfers fuel to the outlet ports 42. Unused fuel is then returned to the separator through return ports 44 and the fuel return passage 48.

The housing 12 of the fuel vapor separator 10 is preferably constructed of extruded aluminum and includes an internal wall 54 and an external wall 56 that form a coolant jacket 52 therebetween. A pair of dividing walls 53 and 55 creates three separate chambers 52a, 52b and 52c in the housing 12. Coolant enters through passage 52 from water inlet 22 is circulated through each of the chambers 52a, 52b and 52c, as will be further described with reference to FIG. 7–10, before exiting the separator at water outlet 24.

Figure 5:
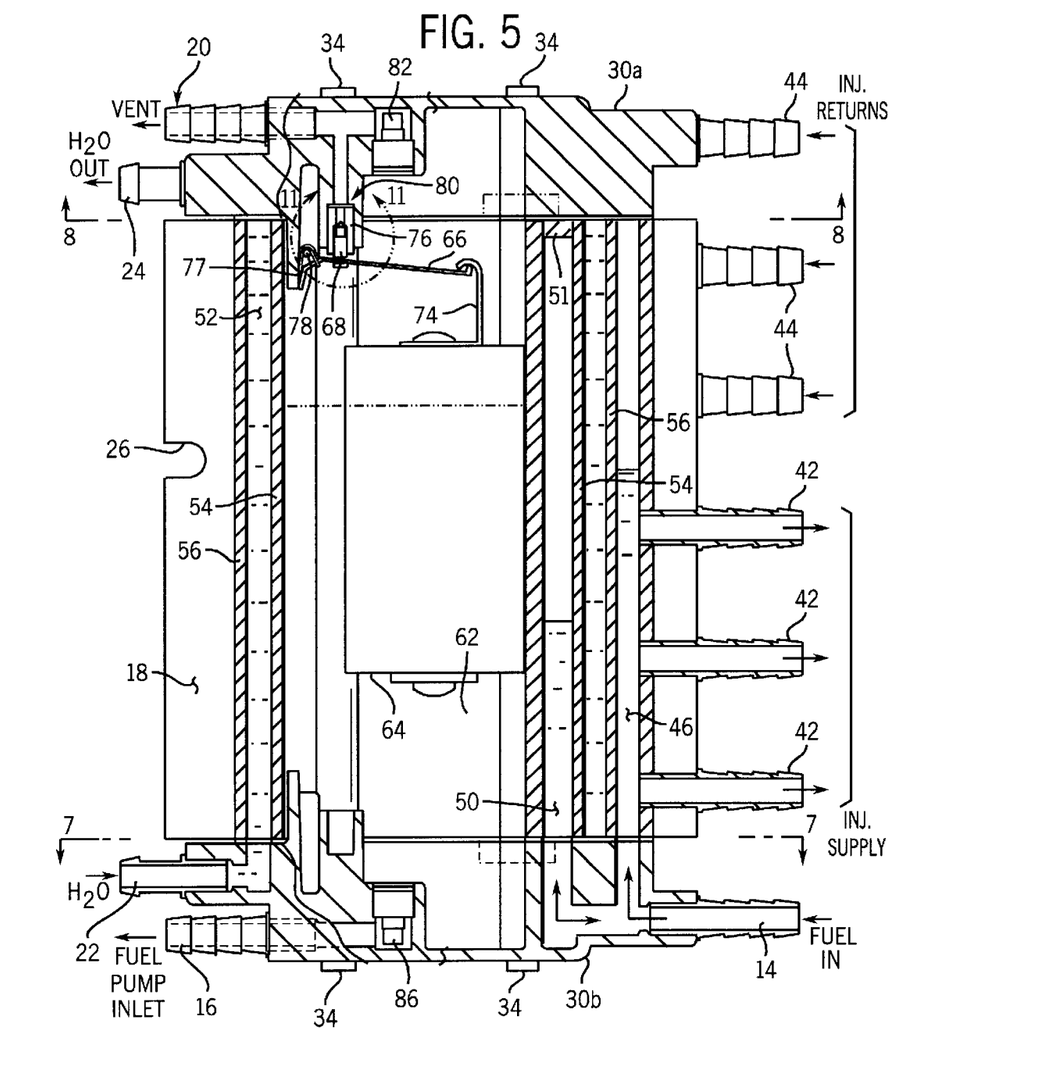
FIG. 5 is a sectional elevation view taken along line 5—5 of FIG. 4.

Referring to FIG. 5, a fuel damper chamber 50 is in fluid communication with fuel inlet 14 to absorb fuel pressure surges. The damper chamber 50 is incorporated into the fuel vapor separator 10 to dampen pressure surges and provide steady fuel pressure to the fuel injectors. Further, the damper helps prevent foaming caused by fuel supplied to the fuel vapor separator 10 under high pressure and occasional high velocity. Fuel foaming is highly undesirable because should the amount of foam in the fuel vapor separator 10 become excessive, foam may be pumped to the engine resulting in lean engine operation, stalling, or overheating due to fuel starvation. The fuel damper chamber 50 absorbs pressure surges in the incoming fuel and helps reduce fuel foaming. The fuel damper chamber 50 is located longitudinally along the housing 12 of the fuel vapor separator 10 and is plugged at its upper end by a plug 51. Pressure surges at the inlet port 14 are cushioned by the flow of fluid into the chamber 50 against resistance provided by the compression of air in the upper end of chamber 50, thereby dampening the pressure surges and reducing foaming.

FIG. 5 also shows the internal wall 54 and external wall 56 spaced from one another to form a coolant jacket 52a–c through which water is circulated under pressure from the engine's water cooling system. The water inlet and outlet ports 22 and 24 open into the lower and upper ends of the coolant jacket 52. As indicated, water jacket 52a–c completely encircles the chamber 62 for effective temperature control of the fuel in the fuel separator 10.

As is well known, outboard marine engines are subjected to violent oscillations and vibrations as the boat travels through waves in a turbulent lake or sea. These unpredictable variations in surface water combined with variations in boat speed and operation, can cause a typical float in a separator to bounce up and down, leading to unintended opening of a standard vent valve. This can in turn lead to fuel venting into the engine and causes engine flooding. This condition is commonly known as "engine spit." The fuel vapor separator 10 is configured to reduce engine spit by providing a closed biased vent valve 80 that includes the aforementioned seat 76 and needle 68, and a spring 77 and a lever arm 66 that is connected to a pin 78. When the fuel vapor separator 10 is filled with fuel to a maximum fill level at which the float 64 rises past its maximum position, an upwardly extending float arm 74 on the float 64 is able to decouple from the lever arm 66. As a result, the closed biased vent valve 80 remains in its closed position even when subjected to vibrations. Conversely, when the fuel vapor separator 10 is empty, or the fluid level in the chamber 62 is lowered, the float 64 drops down and pulls the needle downward to place the valve 80 in its open position to release vaporized fuel from the fuel vapor separator 10. One advantage of this design is that no secondary valve is required to prevent fuel vapor or liquid from escaping if the fuel vapor separator 10 is tilted from its vertical position. Further, this design renders the float 64 and the closed biased vent valve 80 much less susceptible to vibration induced vent opening that can cause engine spit.

Still referring to FIG. 5, the fuel vapor separator 10 removes vapor from the excess fuel and transfers excess fuel back to the fuel pump 130 (FIG. 13) through the outlet port 16. A check valve 86 is located in the bottom cover 30b to maintain fuel pressure within the chamber 62 at a higher pressure than the fuel pressure at the inlet port of the fuel pump 130. Therefore, the check valve 86 ensures that the fuel pump does not draw fuel from the fuel vapor separator 10. The fuel vapor separator 10 also includes an pressure relief valve 82 to relieve excess pressure through the vent port 20 if the pressure in the chamber 62 exceeds a predetermined level.

Figure 6:
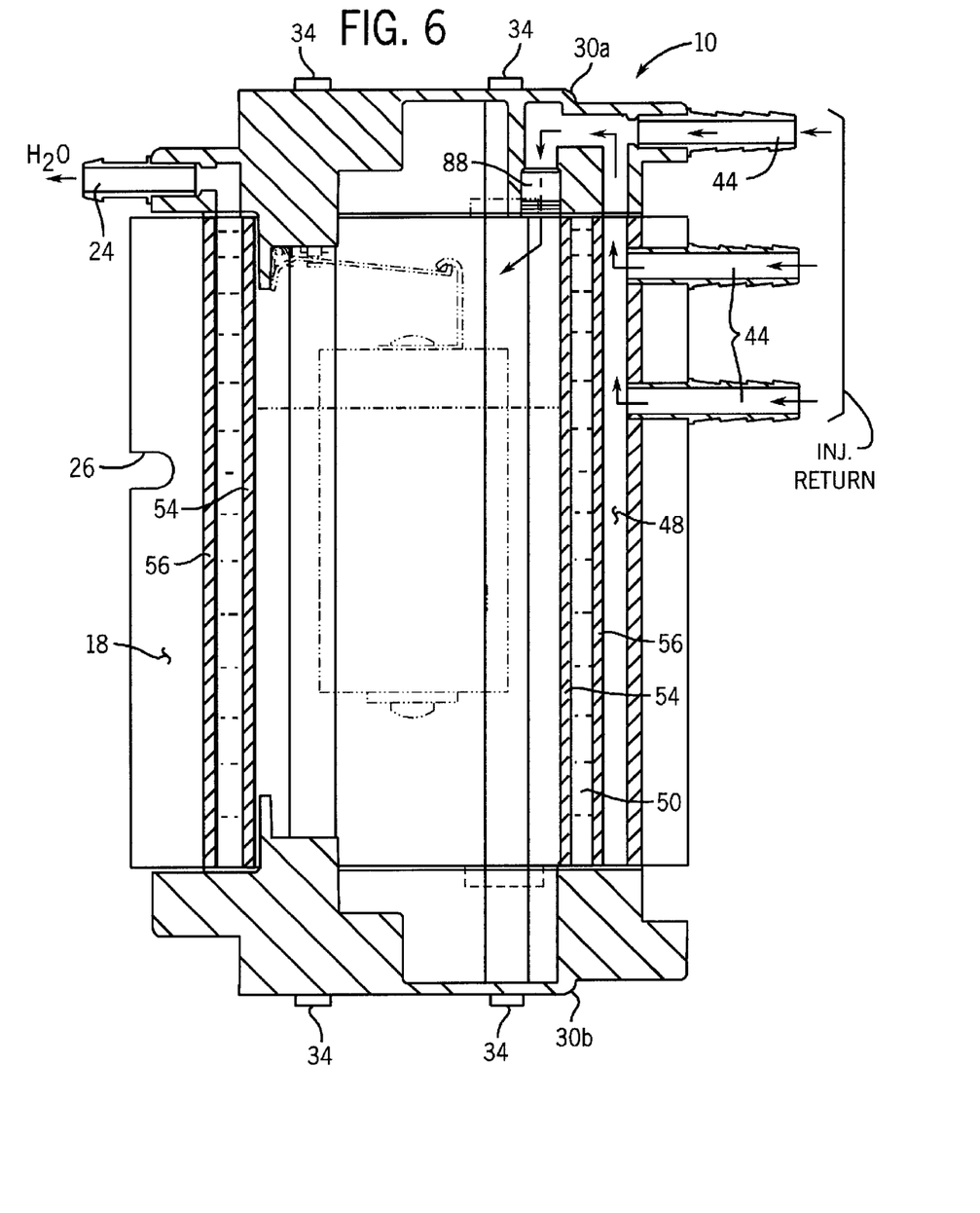
FIG. 6 is a sectional elevation view taken along line 6—6 of FIG. 4.

FIG. 6 is a cross-section of the separator 10 taken along line 6—6 of FIG. 4 showing a cross-section through a return side of the fuel distribution network 40 within the fuel vapor separator 10. In order to minimize the limited space available within an outboard marine engine, a pressure regulator 88 is incorporated into fuel vapor separator 10 rather than placing it elsewhere in the fuel system. The pressure regulator 88 is located in the fuel vapor separator 10 between the enclosed fuel chamber 62 and the fuel distribution network 40 on the fuel return side. The pressure regulator 88 maintains fuel pressure to the fuel injectors that is higher than the fuel pressure in the enclosed fuel chamber 62. Alternatively, the pressure regulator 88 could be located in the fuel supply passage 46 of FIG. 5, upstream from the outlet ports 42. Still another alternative is to use two pressure regulators of differing cracking pressures to control fuel pressure between the fuel injectors and the fuel vapor separator 10 to create a pressure differential for the fuel injectors.

Figure 7:
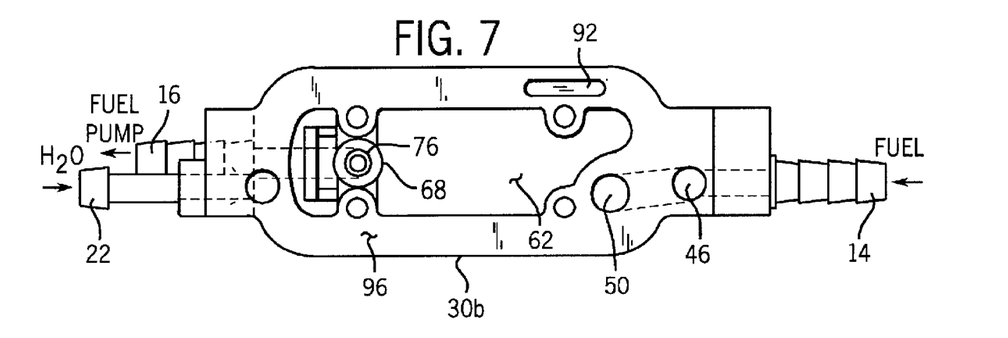
FIG. 7 is a top plan view of a top cover of the fuel vapor separator of FIG. 1 having thereon an associated interchangeable gasket.
Figure 8:
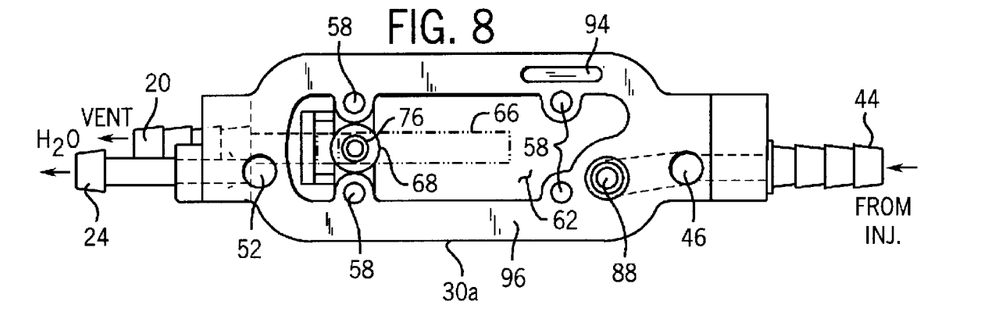
FIG. 8 is a top plan view of a bottom cover of the fuel vapor separator of FIG. 1 having thereon an associated interchangeable gasket.

FIGS. 7 and 8 show the top and bottom covers 30a, 30b, which are constructed identically. The covers 30a, 30b include at least two fuel ports 14, 16 and 20, 44, which open into the fuel vapor separator 10 and which are located on the opposite ends of the top and bottom covers 30a and 30b. While the bottom cover 30b, FIG. 7, shows a fuel port 14 that is used for a fuel supply, the equivalent port is used in the top cover 30a, FIG. 8 to return fuel from a fuel injector. The second set of ports, 16, 20 although are constructed identically, are also used for different purposes. Port 16 of the bottom cover 30b is used to return fuel to the fuel pump, and port 20 is used as the venting outlet port 20. This construction allows interchangeability between the top and bottom covers to reduce manufacturing costs. The water inlet and outlet ports 22, 24 are also constructed identically such that water enters under pressure from the engine's water cooling system into the bottom cover 30b and travels through the bottom cover 30b to a slot 92 as best viewed in FIG. 10.

Figure 9:
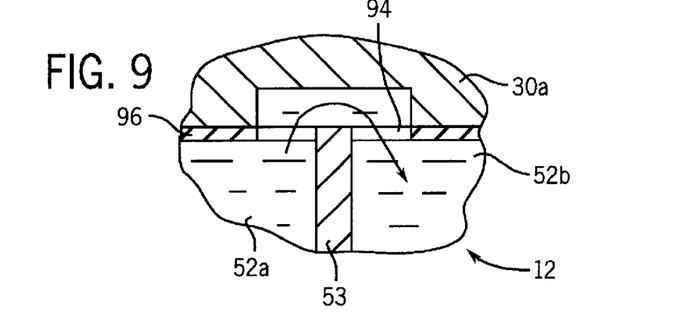
FIG. 9 is a sectional view taken along line 9—9 of FIG. 4 showing a coolant flow path through the top cover.
Figure 10:
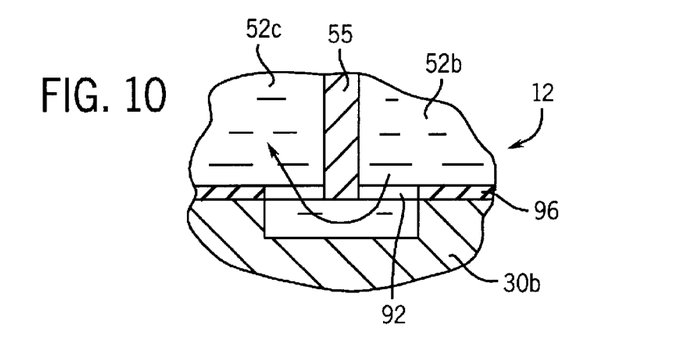
FIG. 10 is a sectional view taken along line 10—10 of FIG. 4 showing a coolant flow path through the bottom cover.

FIGS. 7 and 8 also show that the top and bottom covers 30a and 30b use an identical gasket 96 to seal the covers 30b to the housing 12. The gaskets 96 blocks fuel flow to the coolant passage 52 and seals the cover 30b to the housing 12 while controlling the direction of coolant flow through the fuel vapor separator 10, providing a slot 92, 94 in each of the gaskets 30a, 30b, as will now be described with reference to FIGS. 9 and 10. Referring to FIG. 9, and simultaneously referring back to FIG. 4, as water enters through port 52 and into chamber 52a, water is blocked by wall 53 and forced to enter the top cover 30a through slot 94 and gasket 96. The coolant then flows around wall 53 back into coolant passage 52b in housing 12. Referring to FIG. 10, the coolant from passage 52b is then blocked by wall 55 and forced into the bottom cover 30b by passing through slot 92 of gasket 96. The coolant then travels into passage 52c and exits through port 24 of cover 30a. As should be apparent from FIGS. 7 and 8, the top and bottom cover 30a, 30b are constructed identically and use a pair of interchangeable gaskets 96, each of which is disposed between the respective top or bottom covers 30a, 30b and the housing 12. The top and bottom covers 30a, 30b are mirror images of one another and, therefore, can be utilized interchangeably as the top cover 30a or the bottom cover 30b. Depending on its location, the gasket merely needs to be flipped to be used as a top or bottom gasket. Not only does this provide cost savings, assembly and manufacturing are greatly simplified with this arrangement.

Figure 11:
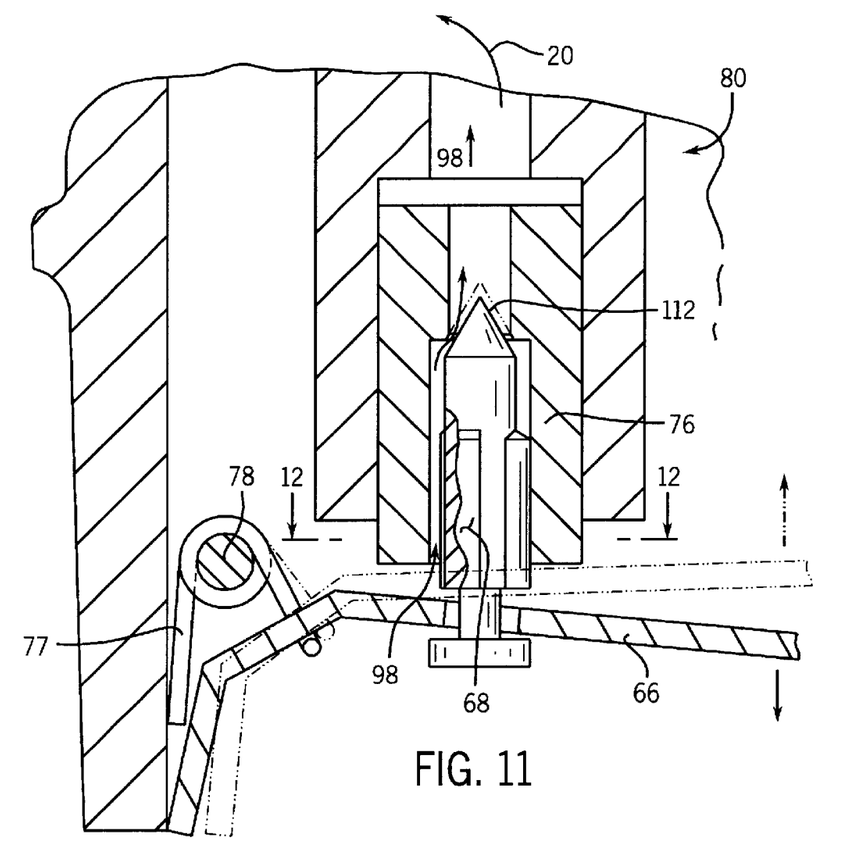
FIG. 11 is an enlarged section taken along line 11—11 of FIG. 5, showing a closed biased vent valve of the fuel vapor separator in an open venting position.
Figure 12:
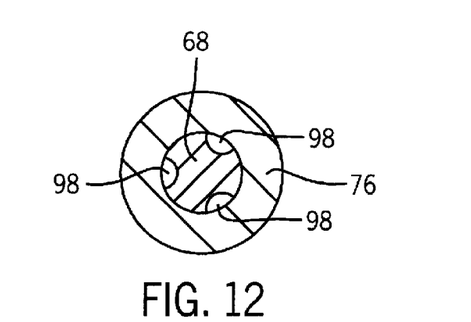
FIG. 12 is a cross-sectional plan view of a portion of the closed biased vent valve taken along line 12—12 of FIG. 11.

Referring to FIG. 11, the closed biased vent valve 80 is illustrated in greater detail. The needle 68 of the valve 80 has a frusto-conical surface 112 in its upper portion which engages with the seat 76 to seal the closed biased vent valve 80. The spring 77 is attached to pin 78. The spring 77 is configured to bias the needle 68 against the seat 76 to place the valve 80 in its closed position. The lever arm 66 is connected to the pin 78 through the spring 77, which pivots in a clockwise or counterclockwise direction, depending on the lever arm 66 position, so that the needle 68 disengages or engages the seat 76 to place the valve 80 in either its open or closed position. The needle 68 has a circular cross-section in its lower portion as best seen in FIG. 12. As a result, when the needle 62 moves downwardly away from the seat 76 to open the valve 80, vapor will flow through a plurality of vertically extending flow paths 98 formed in the periphery of the needle 68 and eventually out vent port 20.

Referring now to FIG. 13, a fuel delivery system 120 is illustrated that incorporates the preferred embodiment of the present invention. The fuel delivery system 120 is located on an outboard marine engine. A primer bulb 126, FIG. 13, is used only to prime the fuel delivery system 120 with fuel prior to starting the engine. A high pressure electric fuel pump 130 draws fuel from the fuel tank 122 via a fuel supply line 124 and transfers fuel into the fuel vapor separator 10. A pressure sensor 132 is located in the fuel supply line 124 downstream of the fuel pump 130. The fuel vapor separator 10 is connected to tee-connector 128 located upstream of the fuel pump 130 via the fuel supply line 124. The internal pressure regulator in the separator 10 maintains a fuel pressure that is higher than the fuel pressure at the inlet port of the fuel pump 130. For instance, the regulator may maintain a pressure differential of 6 p.s.i. If the pressure differential exceeds 6 p.s.i., then the pressure regulator will open and allow excess fuel to flow from the fuel vapor separator 10 to the fuel pump 130. Typically, to keep the length of the pressurized fuel lines 124, 148 as short as possible, the high pressure fuel pump 130, fuel vapor separator 10, and pressurized fuel lines 124, 148 are all within a short distance of one another and housed under the cowling of the outboard motor.

Still referring to FIG. 13, an engine control unit (ECU) 170 receives a pressure signal 134 from the pressure sensor 132 and transmits a fuel supply signal 136 to fuel pump 130. Based at least in part on these signals, the ECU 170 controls the operation of the pump 130 to maintain pressure at each fuel injector so that each fuel injector precisely meters proper quantities of fuel for efficient operation of the engine. Excess fuel not used by the fuel injectors returns to the fuel vapor separator 10 through inlet ports 40.

The present invention has been described in terms of the preferred embodiment, and it is recognized that equivalents, alternatives, and modifications, aside from those expressly stated, are possible and within the scope of the appending claims.

What is claimed is:

1. A fuel vapor separator for an internal combustion engine comprising:
   (A) a housing having two open opposed ends;
   (B) a top cover and a bottom cover that enclose the two open opposed ends of the housing; and
   (C) a fuel distribution network that is attached to the housing to supply fuel to each fuel injector of an engine and to receive fuel return from each fuel injector.

2. The fuel vapor separator of claim 1 further comprising an internal fuel chamber and a pressure regulator, and wherein a pressure regulator is mounted between the internal fuel chamber and the fuel distribution network.

3. The fuel vapor separator of claim 2 wherein the fuel distribution network includes a fuel supply passage and a fuel return passage, and wherein the pressure regulator is mounted in the fuel return passage.

4. The fuel vapor separator of claim 3 wherein the fuel distribution network includes a fuel supply passage and a fuel return passage, and wherein the pressure regulator is mounted in the fuel supply passage.

5. The fuel vapor separator of claim 1 further comprising a mounting flange projecting outwardly from the housing and integrally formed with the housing.

6. The fuel vapor separator of claim 1 wherein the fuel distribution network includes 1) fuel supply and return passages, 2) a plurality of outlet ports in communication with the fuel supply passage to transfer fuel out of the fuel vapor separator, and 3) a plurality of inlet ports in communication with the fuel return passage to allow fuel return into the fuel vapor separator.

7. The fuel vapor separator of claim 1 wherein the top cover and the bottom cover are formed substantially identical to one another.

8. The fuel vapor separator of claim 1 wherein top and bottom covers include at least two fuel ports that open into internal fuel passage, wherein the least two ports are located on opposite ends of the top and bottom covers.

9. The fuel vapor separator of claim 1 wherein the housing includes an internal wall and an external wall defining an internal passage therebetween to circulate liquid coolant for cooling the fuel.

10. The fuel vapor separator of claim 1 wherein the housing is formed by an extrusion process and is substantially rectangular in shape.

11. The fuel vapor separator of claim 1 further comprising a fuel damper chamber in fluid communication with a fuel inlet of the fuel distribution network to absorb fuel pressure surges.

12. The fuel vapor separator of claim 11 wherein the fuel damper chamber is located longitudinally along the housing of the fuel vapor separator.

13. A fuel vapor separator comprising:
- (A) a housing having an enclosed chamber;
- (B) a fuel float having an upwardly extending float arm located in the enclosed chamber; and
- (C) a closed biased vent valve mounted on the housing, wherein the enclosed chamber in the housing is constructed to snuggly hold the fuel float laterally and to allow free float movement vertically.

14. The fuel vapor separator of claim 13 further comprising a lever arm connected to the closed biased vent valve, wherein the upwardly extending float arm and the lever arm are configured to decouple from one another.

15. The fuel vapor separator of claim 13 wherein the housing includes a plurality of extruded bosses and wherein the fuel float is sized to snuggly fit within the extruded bosses.

16. The fuel vapor separator of claim 13 wherein the fuel float has a cross sectional shape that at least substantially matches a cross sectional shape of the enclosed chamber.

17. The fuel vapor separator of claim 13 further comprising top and bottom covers formed substantially identical to enclose the housing.

18. A fuel vapor separator for an internal combustion engine comprising:
- (A) a housing having:
  - (1) an enclosed chamber;
  - (2) a fuel inlet port in communication with the enclosed chamber;
  - (3) a fuel damper chamber in communication with the fuel inlet port to absorb fuel pressure surges; and
- (B) top and bottom covers to enclose the housing.

19. The fuel vapor separator of claim 18 wherein the fuel damper chamber extends longitudinally along the housing of the fuel vapor separator between the enclosed chamber and the external wall of the housing.

20. The fuel vapor separator of claim 18 further comprising a fuel supply passage, a fuel return passage, and a pressure regulator mounted in one of the fuel return passage and the fuel supply passage.

21. The fuel vapor separator of claim 18 wherein the top and bottom covers are constructed identically.

22. A fuel vapor separator comprising:
- (A) a housing having a plurality of coolant passages;
- (B) a top cover and bottom cover having at least one coolant passage;
- (C) an inlet port and an outlet port for coolant flow into and out of the fuel vapor separator; and
- (D) a pair of identical gaskets, each gasket positioned between the housing and the top and bottom covers such that coolant is forced to flow through the plurality of coolant passages.

23. The fuel vapor separator of claim 22 wherein the top and bottom covers are constructed identically and coolant from the inlet port flows through the plurality of coolant passages in the housing of the fuel vapor separator.

24. The fuel vapor separator of claim 22 further comprising a fuel damper chamber in fluid communication with a fuel inlet to absorb fuel pressure surges.

25. A fuel vapor separator for an internal combustion engine comprising:
- (A) a housing having two opposed ends;
- (B) a top cover and a bottom cover that enclose the two opposed ends of the housing;
- (C) a first gasket disposed between the top cover and the housing; and
- (D) a second gasket disposed between the bottom cover and the housing, wherein the top and bottom covers are substantially identical in shape and the first and second gaskets are identical in shape.

26. The fuel vapor separator of claim 25 wherein each gasket blocks fluid flow through at least some of the coolant passage.

27. A method for reducing engine spit comprising the steps of:
- (A) delivering fuel into at least one fuel injector through at least one fuel outlet port that is in communication with a fuel supply passage;
- (B) transferring excess fuel into an enclosed fuel chamber from the at least one fuel injector through at least one fuel inlet port that is in communication with a fuel return passage;
- (C) venting vapor accumulating within the enclosed fuel chamber from a vent valve that is biased to a closed position; and
- (D) allowing a float to move vertically upwardly within the enclosed fuel chamber without opening the vent valve, thereby reducing engine spit caused by unintended opening of the vent valve due to engine vibration.

28. The method of claim 27 wherein the enclosed chamber is formed in a housing and bounded by internal walls of the housing.

29. The method of claim 27 wherein the step of venting vapor includes allowing vapor to vent from the closed biased vent valve when the float is pulling downward on the closed biased vent valve.

30. A system comprising:
- (A) means for delivering fuel into at least one fuel injector through at least one fuel outlet port that is in communication with a fuel supply passage;
- (B) means for transferring excess fuel into an enclosed fuel chamber from the at least one fuel injector through at least one fuel inlet port that is in communication with a fuel return passage;
- (C) means for venting vapor accumulating within the enclosed fuel chamber from a vent valve; and
- (D) means for allowing a float to move vertically upwardly within the enclosed fuel chamber without opening the vent valve, thereby reducing engine spit caused by unintended opening of the vent valve due to engine vibration.

* * * * *

UNITED STATES PATENT AND TRADEMARK OFFICE
CERTIFICATE OF CORRECTION

PATENT NO.     : 6,422,207 B1
DATED          : July 23, 2002
INVENTOR(S)    : Kolb et al.

It is certified that error appears in the above-identified patent and that said Letters Patent is hereby corrected as shown below:

<u>Title page,</u>
Item [57], ABSTRACT,
Line 14, delete "present" and substitute therefore -- prevent --.

Signed and Sealed this

Third Day of December, 2002

JAMES E. ROGAN
*Director of the United States Patent and Trademark Office*